United States Patent
Marcu et al.

(10) Patent No.: US 7,454,326 B2
(45) Date of Patent: Nov. 18, 2008

(54) PHRASE TO PHRASE JOINT PROBABILITY MODEL FOR STATISTICAL MACHINE TRANSLATION

(75) Inventors: Daniel Marcu, Hermosa Beach, CA (US); William Wong, Mission Viejo, CA (US); Kevin Knight, Hermosa Beach, CA (US); Philipp Koehn, Venice, CA (US)

(73) Assignee: University of Southern California, Los Angeles, CA (US)

( * ) Notice: Subject to any disclaimer, the term of this patent is extended or adjusted under 35 U.S.C. 154(b) by 895 days.

(21) Appl. No.: 10/402,350

(22) Filed: Mar. 27, 2003

(65) Prior Publication Data

US 2004/0030551 A1 Feb. 12, 2004

Related U.S. Application Data (60) Provisional application No. 60/368,450, filed on Mar. 27, 2002.

(51) Int. Cl.
G06F 17/28 (2006.01)
G10L 15/00 (2006.01)
G10L 11/00 (2006.01)
G10L 21/00 (2006.01)

(52) U.S. Cl. .............................. 704/2; 704/4; 704/242; 704/277

(58) Field of Classification Search ................... 704/10, 704/2
See application file for complete search history.

(56) References Cited

U.S. PATENT DOCUMENTS

| 5,867,811 | A | * | 2/1999 | O'Donoghue | 704/1 |
| 6,236,958 | B1 | * | 5/2001 | Lange et al. | 704/8 |
| 6,502,064 | B1 | * | 12/2002 | Miyahira et al. | 704/7 |

OTHER PUBLICATIONS

Kenji Yamada and kevin Knight "A Syntax-based Statistical translation Model", 39th Annual Meeting for the Assocation for Computational Linguistics, 2001, pp. 1-8.*
Brown, et al., "The Mathematics of Statistical Machine Translation: Parameter Estimation", *Computational Linguistics*, 19(2):263-311 (1993); XP008022787.
Melamed, "Word-to-Word Models of Translational Equivalence", *Empirical Methods for Exploiting Parallel Texts*, The MIT Press, Mar. 2001; XP002280151.
Marcu, "Towards a Unified Approach to Memory- and Statistical-Based Machine Translation", *Proceedings of ACL-2001*, Toulouse, France, Jul. 2001 <http://www.isi.edu/~marcu/papers/transmem-acl101.pdf>; XP002280148.

(Continued)

*Primary Examiner*—Richemond Dorvil
*Assistant Examiner*—Dorothy S Siedler
(74) *Attorney, Agent, or Firm*—Carr & Ferrell LLP (57) ABSTRACT

A machine translation (MT) system may utilize a phrase-based joint probability model. The model may be used to generate source and target language sentences simultaneously. In an embodiment, the model may learn phrase-to-phrase alignments from word-to-word alignments generated by a word-to-word statistical MT system. The system may utilize the joint probability model for both source-to-target and target-to-source translation applications.

25 Claims, 11 Drawing Sheets

OTHER PUBLICATIONS

Marcu, et al., "A Phrase-Based, Joint Probability Model for Statistical Machine Translation", *Proceedings of the Conference on Empirical Methods in Natural Language Processing (EMNLP-2002)*, Philadelphia, PA, Jul. 2002 <http://www.isi.edu/~marcu/papers/jointmt2002.pdf>; XP002280146.

Och, et al., "Improved Alignment Models for Statistical Machine Translation", *Proceedings of the Joint Conference of Empirical Methods in Natural Language Processing and Very Large Corpora*, pp. 20-28, Univ. of Maryland, College Park, MD, Jun. 1999 <http://acl/ldc/upenn.edu/W/W99/W99-0604.pdf>; XP002280147.

Tillmann, et al., "A Phrase-based Unigram Model for Statistical Machine Translation", *HLT-NAACL 2003*, Edmonton, Canada, May 2003 <http://acl/ldc/upenn.edu/N/N03/N03-2036.pdf>; XP002280149.

Vogel, et al., "The CMU Statistical Machine Translation System", *Machine Translation Summit IX*, New Orleans, LA, Sep. 2003, <http://www.amtaweb.org/summit/MTSummit/FinalPapers/105-vogel-final.pdf>; XP002280150.

* cited by examiner

```
initialize hypothesisStack[0 .. nf];
create initial hypothesis hyp_init;
add to stack hypothesisStack[0];
for i=0 to nf-1:
   for each hyp in hypothesisStack[i]:
      for each new_hyp that can be derived from hyp:
         nf[new_hyp] = number of foreign words covered by new_hyp;
         add new_hyp to hypothesisStack[nf[new_hyp]];
         prune hypothesisStack[nf[new_hyp]];
find best hypothesis best_hyp in hypothesisStack[nf];
output best path that leads to best_hyp;
```

```
        f1 f2 f3
NULL    -- -- ##
  e1    ## -- --
  e2    -- ## --
  e3    -- ## --
```

$$p_w(\bar{f}|\bar{e},a) = p_w(f_1 f_2 f_3 | e_1 e_2 e_3, a)$$
$$= w(f_1|e_1)$$
$$\times \frac{1}{2}(w(f_2|e_2) + w(f_2|e_3))$$
$$\times w(f_3|\text{NULL})$$

PHRASE TO PHRASE JOINT PROBABILITY MODEL FOR STATISTICAL MACHINE TRANSLATION

CROSS-REFERENCE TO RELATED APPLICATIONS

This application claims priority to U.S. Provisional Application Ser. No. 60/368,450, filed on Mar. 27, 2002, the disclosure of which is incorporated by reference.

ORIGIN OF INVENTION

The research and development described in this application were supported by DARPA-ITO under grant number N66001-00-1-9814 and by NSF-STTR grant 0128379. The U.S. Government may have certain rights in the claimed inventions.

BACKGROUND

Most of the noisy-channel-based models used in statistical machine translation (MT) are conditional probability models. In the noisy-channel framework, each source sentence "e" in a parallel corpus is assumed to "generate" a target sentence "f" by means of a stochastic process, whose parameters are estimated using traditional Expectation Maximum (EM) techniques. The generative model explains how source words are mapped into target words and how target words are re-ordered to yield well-formed target sentences. A variety of methods are used to account for the re-ordering of target words, including methods using word-based, template based, and syntax-based models (to name just a few). Although these models use different generative processes to explain how translated words are re-ordered in a target language, at the lexical level these models all assume that source words are individually translated into target words.

SUMMARY

A machine translation (MT) system may develop probabilistic phrase-to-phrase translation lexicons using one or more bilingual corpora. For example, translation lexicons may be developed using a joint probability method, a word-to-word conditional method, or other method.

The MT system may translate one or more sentences (or sentence fragments) using translation lexicons. For example, the MT system may use a greedy method, a method using a beam stack decoder, or other method to decode sentences.

In implementations in which translation lexicons are developed using a phrase-based joint probability model, source and target language sentences may be generated simultaneously. The system may utilize the joint probability model for both source-to-target and target-to-source translation applications.

In embodiments using a word-to-word conditional method, the model may learn phrase-to-phrase alignments from word-to-word alignments generated by a word-to-word statistical MT system.

DETAILED DESCRIPTION

Systems and techniques of the current disclosure may be used to provide more efficient and accurate machine translation (MT). In some implementations, the MT system may develop phrase-to-phrase probabilistic translation lexicons. The probabilistic translation lexicons may be automatically learned from bilingual corpora using, for example, joint probability models or word-to-word conditional models.

These translation lexicons may then be used to translate new sentences. That is, the translation lexicons may be used to translate sentences not included in the corpora used to train the MT system. Systems and techniques for translation include a greedy method, a method using a beam stack decoder, or other methods.

Figure 1:
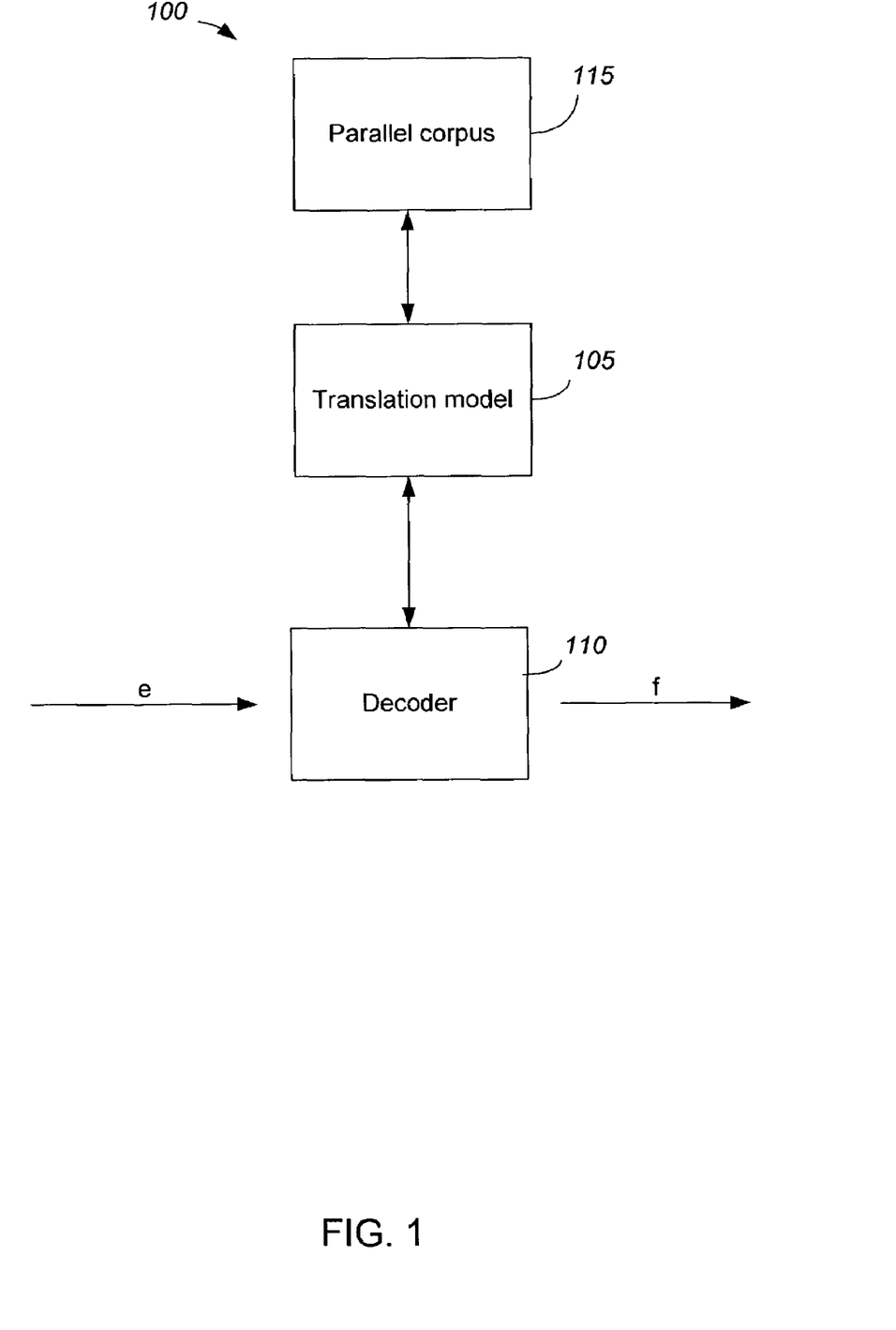
FIG. 1 is a block diagram of a machine translation (MT) system including a phrase-based joint probability translation model.

FIG. 1 shows a machine translation (MT) system 100 including a translation model 105 and a decoder 110. Translation model 105 may include translation lexicons that may be learned from bilingual corpora. Translation model 105 may assume that lexical correspondences can be established at the word level and the phrase level as well. Decoder 110 may use the translation lexicons to provide a translated sentence based on an input sentence.

Phrase-to-Phrase Translation Lexicon Development

According to some embodiments, model 105 may be trained according to a joint probability model. That is, model 105 may develop a translation lexicon automatically using a parallel corpus 115 including parallel source and target language strings. Model 105 does not try to capture how source sentences can be mapped into target sentences, but rather generates source and target sentences simultaneously. In other words, the translation model is a joint probability model that can be easily marginalized in order to yield conditional probability models for both source-to-target and target-to-source machine translation applications.

In an embodiment, model 105 may generate sentence pairs using the following stochastic process:

1. Generate a bag of concepts C.

2. For each concept $c_i \in C$, generate a pair of phrases ($\vec{e}_i$, $\vec{f}_i$), according to the distribution $t(\vec{e}_i, \vec{f}_i)$, where $\vec{e}_i$ and $\vec{f}_i$ each contain at least one word.

3. Order the phrases generated in each language so as to create two linear sequences of phrases; sequences correspond to the sentence pairs in a bilingual corpus.

For simplicity, it is assumed that the bag of concepts and the ordering of the generated phrases are modeled by uniform distributions. It is also assumed that $c_i = (\vec{e}_i, \vec{f}_i)$. Under these assumptions, it follows that the probability of generating a sentence pair (E, F) using concepts $c_i \in C$ is given by the product of all phrase-to-phrase translation probabilities, $$\prod_{c_i \in C} (\vec{e}_i, \vec{f}_i)$$

that yield bags of phrases that can be ordered linearly so as to obtain the sentences E and F.

Figure 2:
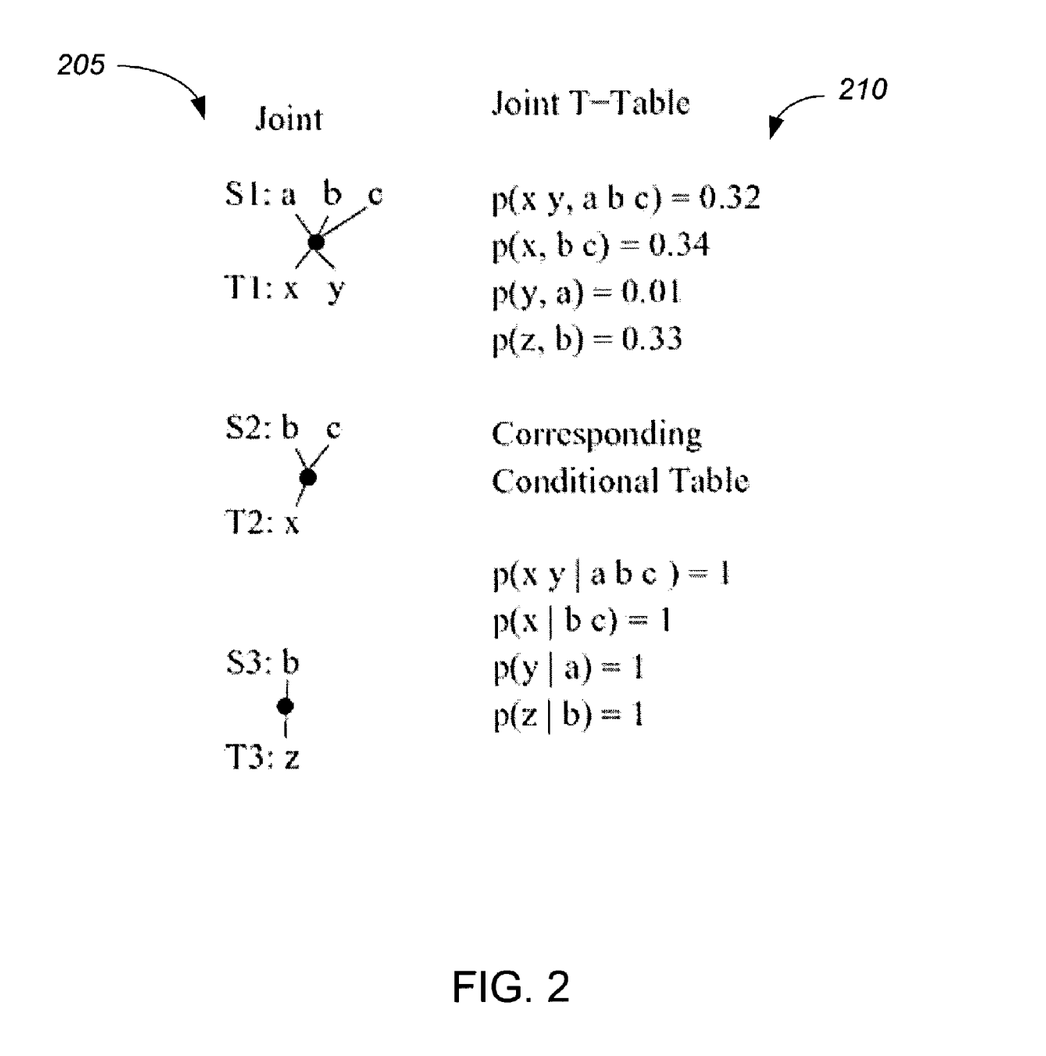
FIG. 2 shows alignments and probability distributions generated by the phrase-based joint probability model.

FIG. 2 illustrates an example. The sentence pair "a b c"--"x y" can be generated using two concepts, ("a b": "y") and ("c": "x"), or one concept, ("a b c": "x y"), because in both cases the phrases in each language can be arranged in a sequence that would yield the original sentence pair. However, the same sentence pair cannot be generated using the concepts ("a b": "y") and ("c": "y") because the sequence "x y" cannot be recreated from the two phrases "y" and "y". Similarly, the pair can be generated using concepts ("a c": "x") and ("b": "y") because the sequence "a b c" cannot be created by concatenating the phrases "a c" and "b".

The set of concepts C can be linearized into a sentence pair (E, F) if E and F can be obtained by permuting the phrases $\vec{e}_i$ and $\vec{f}_i$ that characterize all concepts $c_i \in C$. We denote this property using the predicate L(E, F, C). Under this model, the probability of a given sentence pair (E, F) can then be obtained by summing up over all possible ways of generating bags of concepts $c_i \in C$ that can be linearized to (E, F).

$$p(E, F) = \sum_{c=c|L(E,F,C)} \prod_{c_i \in C} t(\vec{e}_i, \vec{f}_i)$$

The model described above ("Model 1") has been found to produce fairly good alignments. However, this model may be unsuited for translating unseen sentences, as it imposes no constraints on the ordering of the phrases associated with a given concept. In order to account for this, a modified model ("Model 2") was developed to account for distortions. The generative story of the model is this:

1. Generate a bag of concepts C.
2. Initialize E and F to empty sequences c.
3. Randomly take a concept $c_i \in C$ and generate a pair of phrases $(\vec{e}_i, \vec{f}_i)$, according to the distribution $t(\vec{e}_i, \vec{f}_i)$, where $\vec{e}_i$ and $\vec{f}_i$ each contain at least one word. Remove then $c_i$ from C.

4. Append phrase $\vec{f}_i$ at the end of F. Let k be the start position of $\vec{f}_i$ in F.

5. Insert phrase $\vec{e}_i$ at position l in E provided that no other phrase occupies any of the positions l and $l+|\vec{e}_i|$, where $|\vec{e}_i|$ gives the length of the phrase $\vec{e}_i$. The system hence create the alignment between the two phrases $\vec{e}_i$ and $\vec{f}_i$ with probability $$\prod_{p=k}^{k+|\vec{f}_i|} d(p, (l+|\vec{e}_i|)/2),$$

where d(i, j) is a position-based distortion distribution.

6. Repeat steps 3 to 5 until C is empty.

In this model, the probability to generate a sentence pair (E, F) is given by the following formula:

$$p(E, F) = \sum_{C \in |L(E,F,C)} \prod_{c_i \in C} \left[ t(e_i, f_i) \times \prod_{k=1}^{|\vec{f}_i|} d(pos(f_i^k), pos_{cm}(\vec{e}_i)) \right]$$

where $pos(\vec{f}_i^k)$ denotes the position of word k of phrase $\vec{f}_i$ in sentence F and $pos_{cm}(\vec{e}_i^k)$ denotes the position in sentence E of the center of mass of phrase $e_i$.

Figure 3:
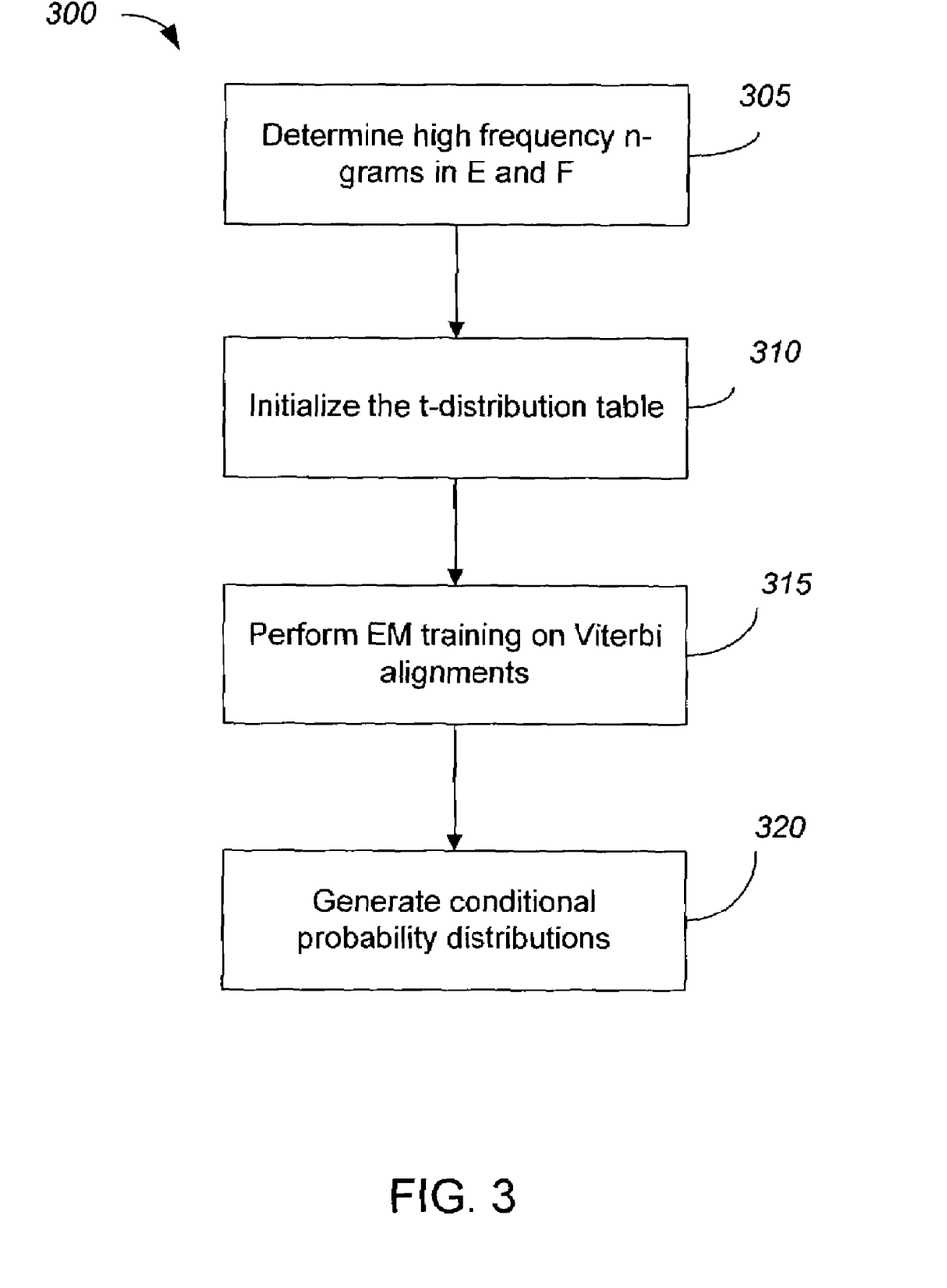
FIG. 3 is a flowchart describing a training algorithm for the phrase-based joint probability model.

Training the models described above may be computationally challenging. Since there is an exponential number of alignments that can generate a sentence pair (E, F), the Expectation Maximum (EM) training algorithm cannot be applied exhaustively. FIG. 3 is a flowchart describing a training algorithm 300 for the phrase-based joint probability model which takes this problem into account.

The system determines high-frequency n-grams in E and F (block 305). If one assumes from the outset that any phrases $\vec{e}_i \in E^*$ and $\vec{f}_i \in F^*$ can be generated from a concept $c_i$, one would need a supercomputer in order to store in the memory a table that models the $t(\vec{e}_i, \vec{f}_i)$ distribution. Since the system doesn't have access to computers with unlimited memory, the system initially learns t distribution entries only for the phrases that occur often in the corpus and for unigrams. Then, through smoothing, the system learns t distribution entries for the phrases that occur rarely as well. In order to be considered in the next step of the algorithm, a phrase has to occur at least five times in the corpus.

The next step is to initialize the t-distribution table (block 310). Before the EM training procedure starts, one has no idea what word/phrase pairs are likely to share the same meaning. In other words, all alignments that can generate a sentence pair (E, F) can be assumed to have the same probability. Under these conditions, the evidence that a sentence pair (E, F) contributes to the fact that $(\vec{e}_i, \vec{f}_i)$ are generated by the same concept $c_i$ is given by the number of alignments that can be built between (E, F) that have a concept $c_i$ that is linked to phrase $\vec{e}_i$ sentence E and phrase $\vec{f}_i$ in sentence F divided by the total number of alignments that can be built between the two sentences. Both these numbers can be easily approximated.

Given a sentence E of l words, there are S(l, k) ways in which the l words can be partitioned into k non-empty sets/concepts, where S(l, k) is the Stirling number of second kind.

$$S(l, k) = \frac{1}{k!} \sum_{i=0}^{k-1} (-1)^i \binom{k}{i} (k-i)^n$$

There are also S(m, k) ways in which the m words of a sentence F can be partitioned into k non-empty sets. Given that any words in E can be mapped to any words in F, it follows that there are $$\sum_{k=1}^{\min(l,m)} k!S(s(l,k)S(m,k)$$

alignments that can be built between two sentences (E, F) of lengths l and m, respectively. When a concept ci generates two phrases ($\vec{e}_i$, $\vec{f}_i$) of length a and b, respectively, there are only l-a and m-b words left to link. Hence, in the absence of any other information, the probability that phrases $\vec{e}_i$ and $\vec{f}_i$ are generated by the same concept $c_i$ is given by the following formula:

$$\frac{\sum_{k=1}^{\min(l-a,m-b)} k!S(s(l-a,k)S(m-b,k)}{\sum_{k=1}^{\min(l,m)} k!S(s(l,k)S(m,k)}$$

Note that the fractional counts returned by the formula are only an approximation of the t distribution the system are interested in because the Stirling numbers of the second kind do not impose any on the words that are associated with a given concept be consecutive. However, since the formula overestimates the numerator and denominator equally, the approximation works well in practice.

In the second step of the algorithm, the system applies the formula to collect fractional counts for all unigram and high-frequency n-gram pairs in the Cartesian product defined over the phrases in each sentence pair (E, F) in a corpus. The system sums over all these t-counts and normalizes to obtain an initial joint distribution t. This step amounts to running the EM algorithm for one step over all possible alignments in the corpus.

In the third step of the algorithm, the system performs EM training on Viterbi alignments (block 315). Given a non-uniform t distribution, phrase-to-phrase alignments have different weights and there are no other tricks one can apply to collect fractional counts over all possible alignments in polynomial time. Starting with block 315 of the algorithm in FIG. 3, for each sentence pair in a corpus, the system greedily produce an initial alignment by linking together phrases so as to create concepts that have high t probabilities. The system then hillclimbs towards the Viterbi alignment of highest probability by breaking and merging concepts, swapping words between concepts, and moving words across concepts. The system computes the probabilities associated with all the alignments the system generated during the hillclimbing process and collects t counts over all concepts in these alignments.

The system applies this Viterbi-based EM training procedure for a few iterations. The first iterations estimate the alignment probabilities using Model 1. The rest of the iterations estimate the alignment probabilities using Model 2.

During training, the system applies smoothing so the system can associate non-zero values to phrase-pairs that do not occur often in the corpus.

At the end of the training procedure, the system takes marginals on the joint probability distributions t and d (block 320). This yields conditional probability distributions t($\vec{e}_i$, $\vec{f}_i$) and d(posF|posE), which the system uses for decoding.

When the system run the training procedure in FIG. 3 on the corpus in FIG. 2, after four Model 1 iterations the system obtain the alignments 205 and the joint and conditional probability distributions 210. At prima facie, the Viterbi alignment for the first sentence pair may appear incorrect because humans have a natural tendency to build alignments between the smallest phrases possible. However, note that the choice made by our model is quite reasonable. After all, in the absence of additional information, the model can either assume that "a" and "y" mean the same thing or that phrases "a b c" and "x y" mean the same thing. The model chose to give more weight to the second hypothesis, while preserving some probability mass for the first one.

Also note that although the joint distribution puts the second hypothesis at an advantage, the conditional distribution does not. The conditional distribution 210 is consistent with our intuitions that tell us that it is reasonable both to translate "a b c" into "x y", as well as "a" into "y". The conditional distribution mirrors our intuitions.

In an alternative embodiment, a system such as system 100 of FIG. 1 may learn phrase-to-phrase translations from word-to-word alignments. That is, a model such as model 105 may develop a phrase translation lexicon by expanding word-to-word translation lexicons learned by word-to-word models. The phrase translation model is based on the noisy channel model. The system use Bayes rule to reformulate the translation probability for translating a foreign sentence f into English e as $$\mathrm{argmax}_e p(e|f) = \mathrm{argmax}_e p(f|e)p(e)$$

This allows for a language model p(e) and a separate translation model P(f|e).

During decoding (i.e., translation), the foreign input sentence f is segmented into a sequence of I phrases $\bar{f}_1^I$. The system assumes a uniform probability distribution over all possible segmentations.

Each foreign phrase $\bar{f}_i$ in $\bar{f}_1^I$ is translated into an English phrase $\bar{e}_i$. The English phrases may be re ordered. Phrase translation is modeled by a probability distribution $\phi(\bar{f}_i|\bar{e}_i)$. Due to the Bayes rule, the translation direction is inverted from a modeling standpoint.

Reordering of the English output phrases is modeled by a relative distortion probability distribution $d(a_i-b_{i-1})$, where $a_i$ denotes the start position of the foreign phrase that was translated into the ith English phrase, and $b_{i-1}$ denotes the end position of the foreign phrase translated into the (i-1)th English phrase.

The distortion probability distribution d(·) may be trained using a joint probability model, such as that described in connection with the previous described embodiment. Alternatively, the system could also use a simpler distortion model $d(a_i-b_{i-1})=\alpha^{|a_i-b_{i-1}-1|}$ with an appropriate value for the parameter α.

In order to calibrate the output length, the system introduces a factor ω for each generated English word in addition to the trigram language model $p_{LM}$. This is a simple means to optimize performance. Usually, this factor is larger than 1, biasing longer output.

In summary, the best English output sentence $e_{best}$ given a foreign input sentence f according to the model is $$E_{best} = \text{argmax}_e p(e|f)$$

$$= \text{argmax}_e p(f|e) p_{LM}(e) \omega^{length(e)}$$

where p(f|e) is decomposed into $$p(\bar{f}_1^I | \bar{e}_1^I) = \prod_{i=1}^{I} \phi(\bar{f}_i | \bar{e}_i) d(a_i - b_{i-1})$$

The Giza++ toolkit was developed to train word-based translation models from parallel corpora. As a by-product, it generates word alignments for this data. The system may improve this alignment with a number of heuristics. The system collects all aligned phrase pairs that are consistent with the word alignment. The words in a legal phrase pair are only aligned to each other, and not to words outside. Given the collected phrase pairs, the system estimates the phrase translation probability distribution by relative frequency:

$$\phi(\bar{f} | \bar{e}) = \frac{\text{count}(\bar{f} | \bar{e})}{\sum_{\bar{f}} \text{count}(\bar{f} | \bar{e})}$$

In some embodiments, smoothing may be performed.

If the system collects all phrase pairs that are consistent with word alignments, this includes many non-intuitive phrases. For instance, translations for phrases such as "house the" may be learned. Intuitively the system would be inclined to believe that such phrases do not help. Restricting possible phrases to syntactically motivated phrases could filter out such non-intuitive pairs.

Another motivation to evaluate the performance of a phrase translation model that contains only syntactic phrases comes from recent efforts to built syntactic translation models. In these models, reordering of words is restricted to reordering of constituents in well-formed syntactic parse trees. When augmenting such models with phrase translations, typically only translation of phrases that span entire syntactic subtrees is possible. It is important to know if this is a helpful or harmful restriction.

The system may define a syntactic phrase as a word sequence that is covered by a single subtree in a syntactic parse tree. We collect syntactic phrase pairs as follows: the system word-aligns a parallel corpus, as described above. The system then parses both sides of the corpus with syntactic parsers. For all phrase pairs that are consistent with the word alignment, the system additionally checks if both phrases are subtrees in the parse trees. Only these phrases are included in the model. Hence, the syntactically motivated phrase pairs learned are a subset of the phrase pairs learned without knowledge of syntax. The phrase translation probability distribution may be estimated by relative frequency.

Figure 8:
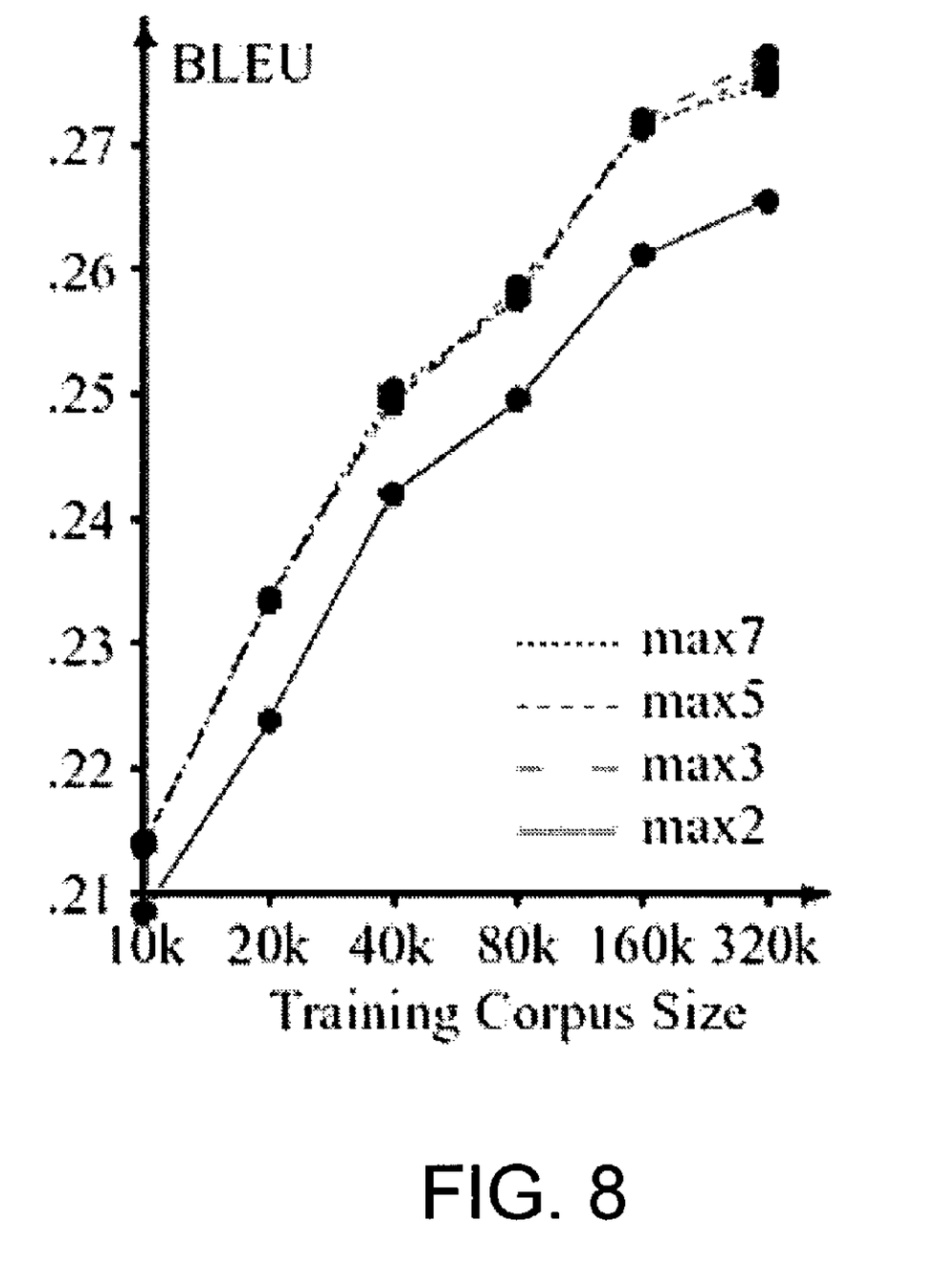
FIG. 8 is a graph showing the effect of phrase length on performance.

FIG. 8 displays results from experiments with different maximum phrase lengths. All phrases consistent with the word alignment (AP) were used. As shown in FIG. 8, limiting the length to a maximum of only three words per phrase already achieves top performance. Learning longer phrases does not yield any improvement. Reducing the limit to only two, however, is detrimental. Allowing for longer phrases increases the phrase translation table size. The increase is almost linear with the maximum length limit. Still, none of these model sizes caused memory problems.

The system may validate the quality of a phrase translation pair by checking how well its words translate to each other. For this, a lexical translation probability distribution w(f|e) may be used. The distribution may be estimated by relative frequency from the same word alignments as the phrase model $$w(f | e) = \frac{\text{count}(f, e)}{\sum_{f'} \text{count}(f', e)}$$

A special English NULL token may be added to each English sentence and aligned to each unaligned foreign word.

Given a phrase pair $\bar{f},\bar{e}$ and a word alignment a between the foreign word positions I-1, . . . , n and the English word positions j=0, 1, . . . , m, the system computes the lexical weight $p_w$ by $$p_w(\bar{f} | \bar{e}, a) = \prod_{i=1}^{n} \frac{1}{|\{j | (i, j) \in a\}|} \sum_{\forall (i,j) \in a} w(f_i | e_j)$$

Figure 9:
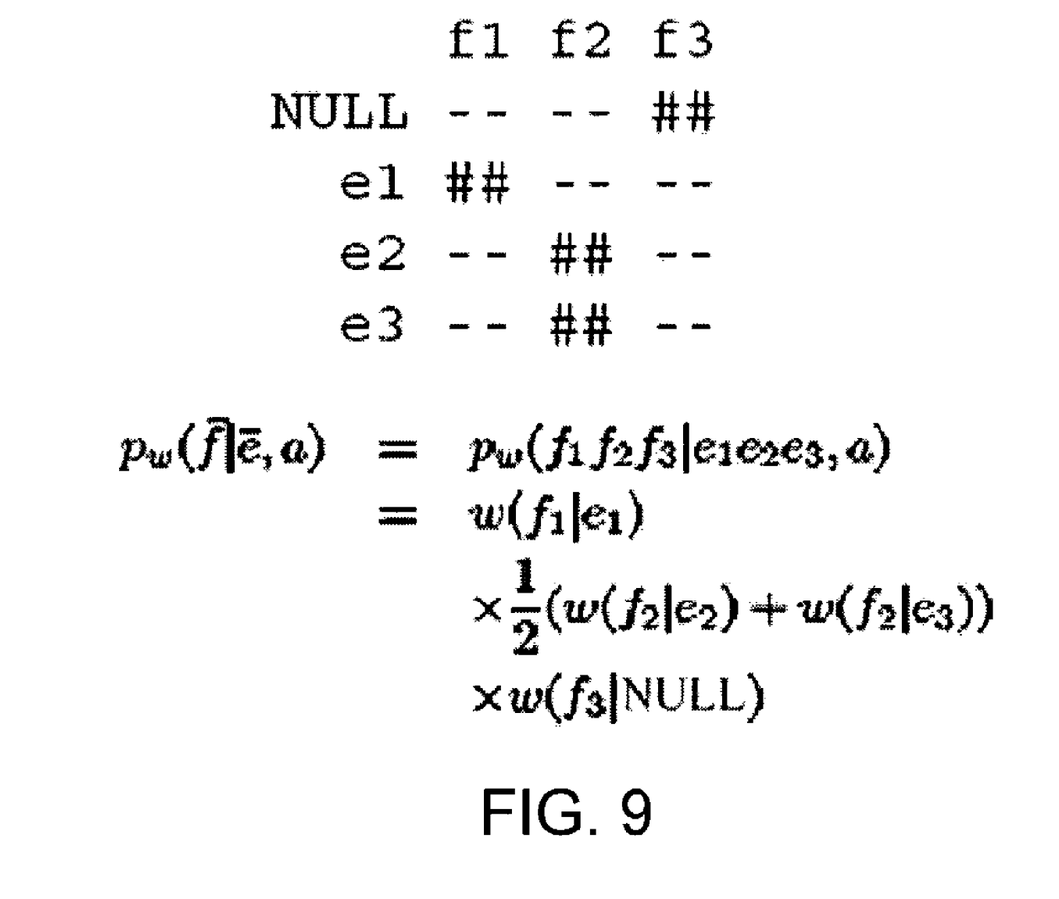
FIG. 9 shows an example estimation of a lexical weight.

FIG. 9 shows an example.

If there are multiple alignments a for a phrase pair $(\bar{f},\bar{e})$, the system may use the alignment with the highest lexical weight:

$$p_w(\bar{f}|\bar{e}) = \max_a p_w(\bar{f}|\bar{e},a)$$

The system may use the lexical weight $p_w$ during translation as an additional factor. This means that the model p(f|e) is extended to $$p(\bar{f}_1^I | \bar{e}_1^I) = \prod_{i=1}^{I} \phi(\bar{f}_i | \bar{e}_i) d(a_i - b_{i-1}) p_w(\bar{f}_i | \bar{e}_i, a)^\lambda$$

The parameter $\lambda$ defines the strength of the lexical weight $p_w$. Good values for this parameter are around 0.25.

Figure 10:
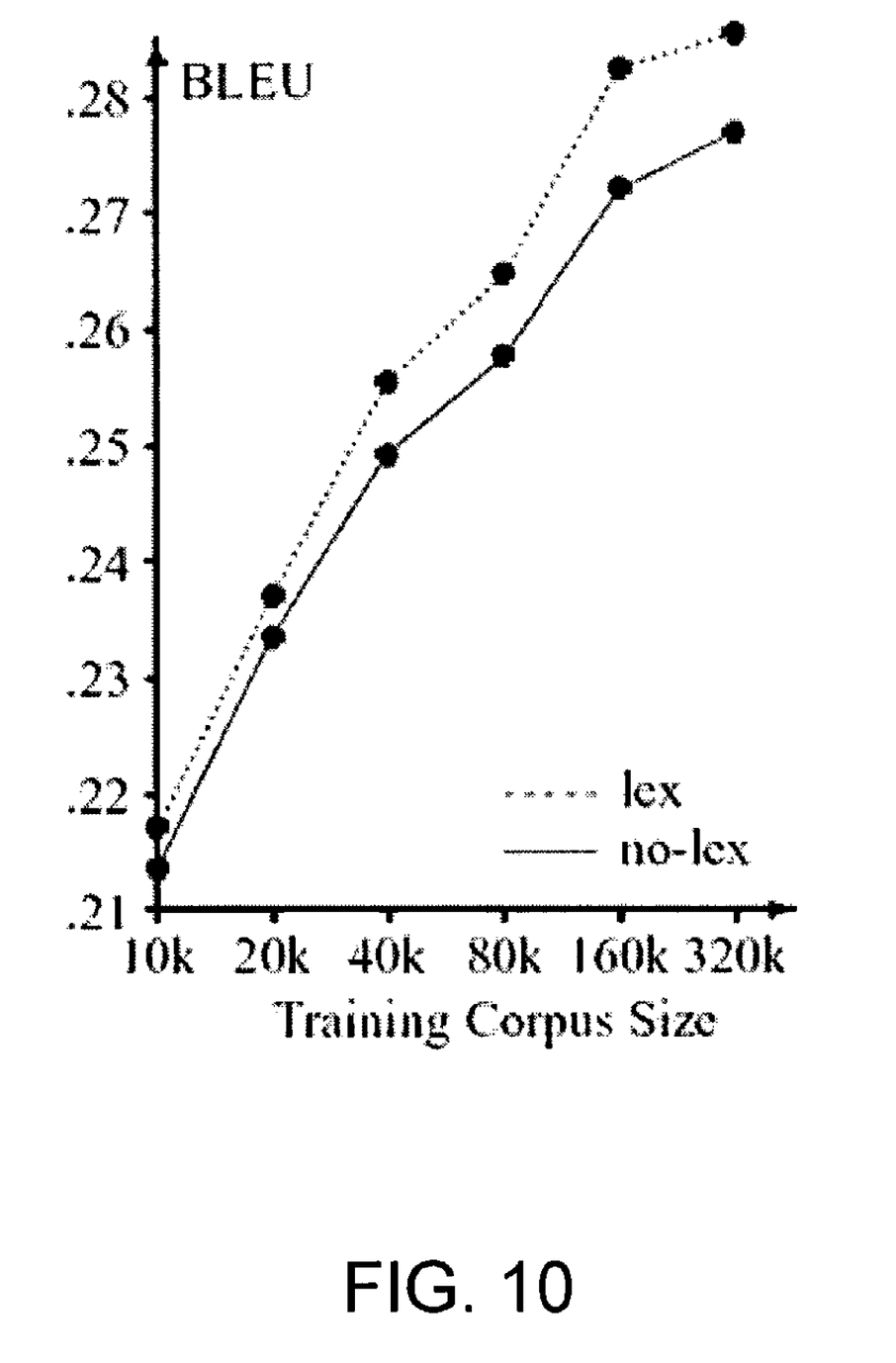
FIG. 10 is a graph showing the effect of lexical weighting on performance.

FIG. 10 shows the impact of lexical weighting on machine translation performance. In our experiments, the system achieved improvements of up to 0.01 on the BLEU score scale.

Figure 5:
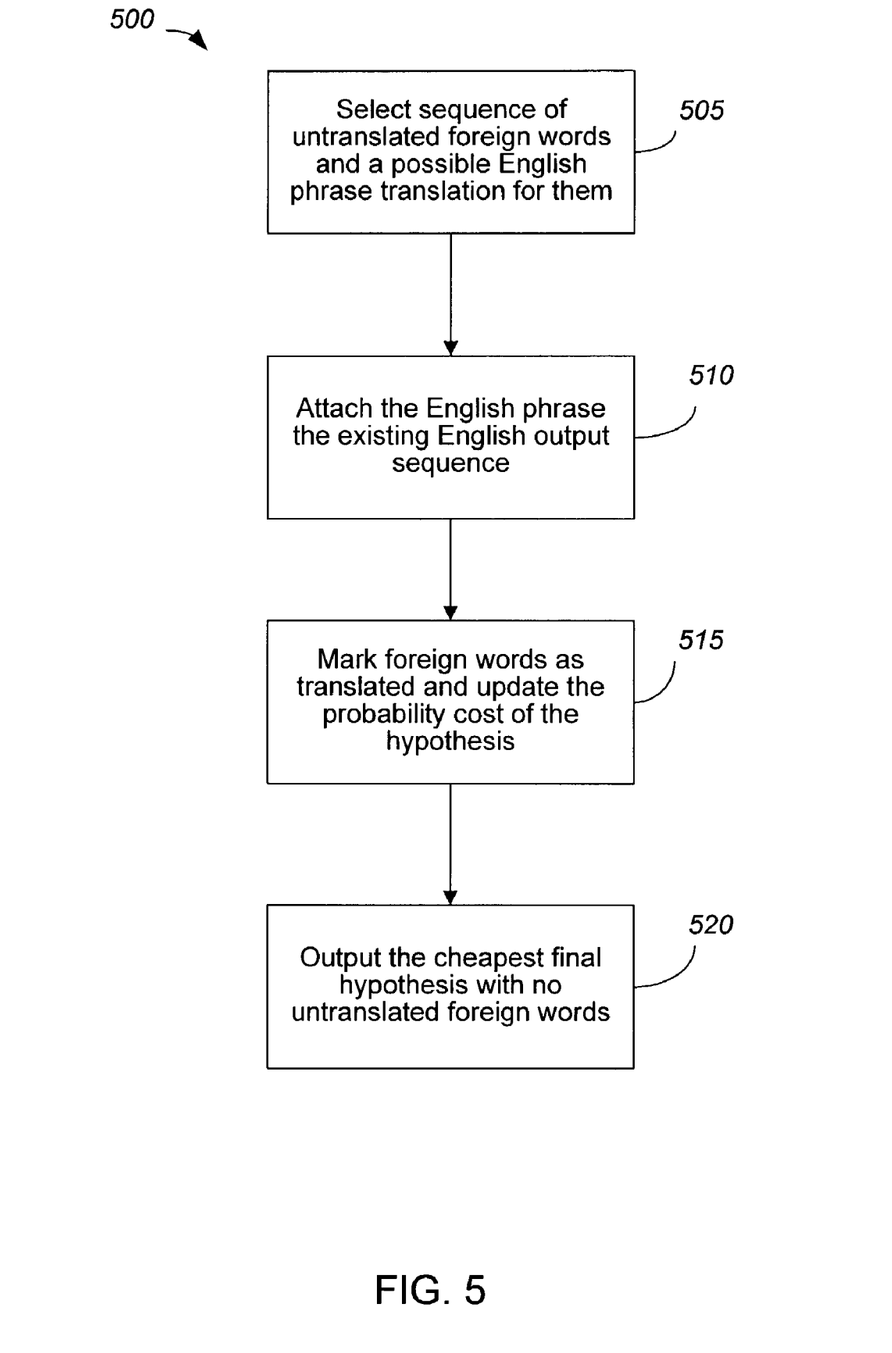
FIG. 5 is a flowchart describing a phrase-based decoding algorithm according to an embodiment.
Figure 6:
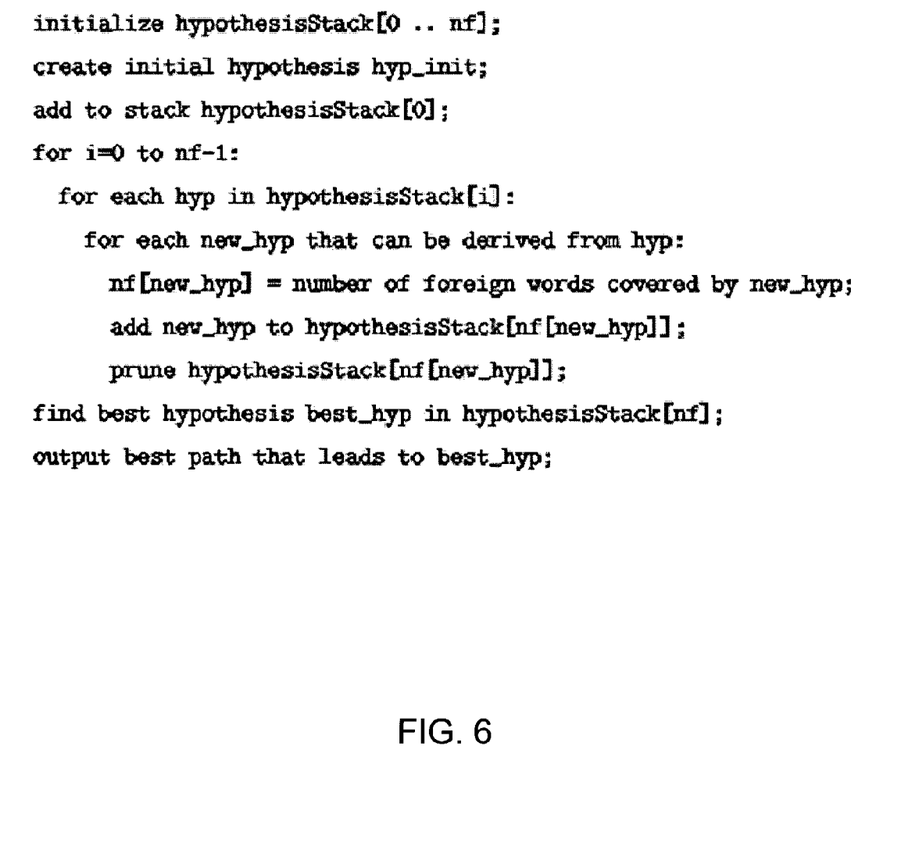
FIG. 6 shows pseudo code describing the phrase-based decoding algorithm.

Phrase translation with a lexical weight is a special case of the alignment template model with one word class for each word. The simplification performed by the system has the advantage that the lexical weights can be factored into the phrase translation table beforehand, speeding up decoding. In contrast to the beam search decoder for the alignment template model, the decoding method described in connection with FIGS. 5 and 6, are able to search all possible phrase segmentations of the input sentence, instead of choosing one segmentation before decoding.

In the experiment, the system learned phrase pairs from word alignments generated by Giza++. The IBM Models that this toolkit implements only allow at most one English word to be aligned with a foreign word. The system remedies this problem with a heuristic approach.

First, the system aligns a parallel corpus bidirectionally, i.e., foreign to English and English to foreign. This gives two word alignments that the system tries to reconcile. If the system intersects the two alignments, the system gets a high-precision alignment of high-confidence alignment points. If the system takes the union of the two alignments, the system gets a high-recall alignment with additional alignment points.

The space between intersection and union may be expansion heuristics that start with the intersection and add additional alignment points. The decision which points to add may depend on a number of criteria, e.g., which alignment does the potential alignment point exist (Foreign-English or English-Foreign), whether the potential point neighbor already established points, whether "neighboring" means directly adjacent (block-distance), or also diagonally adjacent whether the English or the foreign word that the potential point connects are unaligned so far, and if both are unaligned and the lexical probability for the potential point.

The system starts with intersection of the two word alignments. The system only adds new alignment points that exist in the union of two word alignments. The system also always requires that a new alignment point connects at least one previously unaligned word.

First, the system expands to only directly adjacent alignment points. The system checks for potential points starting from the top right corner of the alignment matrix, checking for alignment points for the first English word, then continues with alignment points for the second English word, and so on. This is done iteratively until no more alignment point can be added. In a final step, the system adds non-adjacent alignment points, with otherwise the same requirements.

Figure 11:
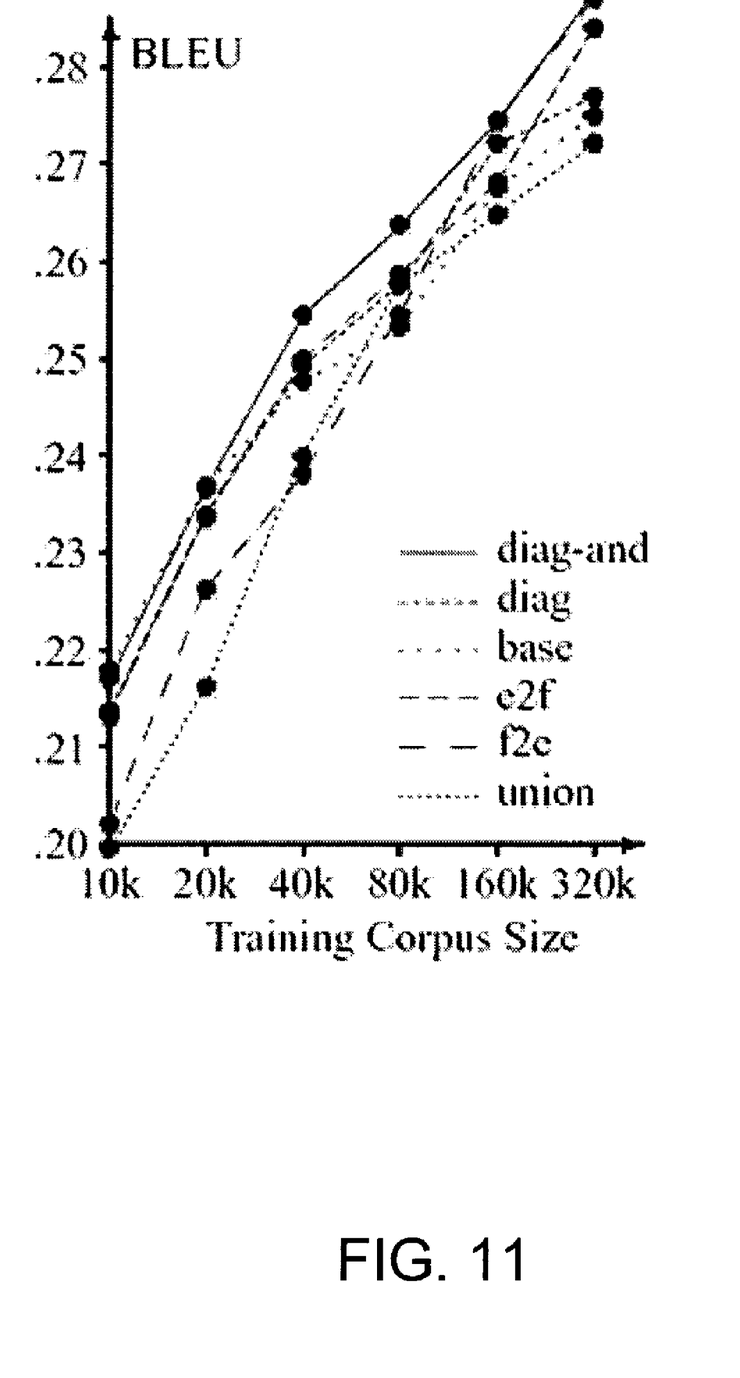
FIG. 11 is a graph comparing the performance of different heuristics.

FIG. 11 shows the performance of this heuristic (base) compared against the two mono-directional alignments (e2f, f2e) and their union (union). The figure also contains two modifications of the base heuristic: In the first (diag) the system also permit diagonal neighborhood in the iterative expansion stage. In a variation of this (diag-and), the system requires in the final step that both words are unaligned.

The ranking of these different methods varies for different training corpus sizes. For instance, the alignment f2e starts out second to worst for the 10,000 sentence pair corpus, but ultimately is competitive with the best method at 320,000 sentence pairs. The base heuristic is initially the best, but then drops off. The discrepancy between the best and the worst method is quite large, about 0.2 BLEU (an IBM scoring system), for almost all training corpus sizes, albeit not always significantly.

Decoding

The phrase-based decoder in some embodiments may employ a beam search algorithm. The English output is generated left to right in form of partial translations (or hypotheses).

The system may begin the search of possible translations in an initial state where no foreign input words are translated and no English output words have been generated. New states may be created by extending the English output with a phrasal translation of that covers some of the foreign input words not yet translated. The current cost of the new state is the cost of the original state multiplied with the translation, distortion and language model costs of the added phrasal translation.

Each search space (hypothesis) is represented by (a) a back link to the best previous state, (b) the foreign words covered so far, (c) the last two English words generated (needed for computing future language model costs), (d) the end of the last foreign phrase covered (needed for computing future distortion costs), (e) the last added English phrase (needed for reading the translation from a path of hypotheses), (f) the cost so far, and (g) the estimate of the future cost.

Final states in the search are hypotheses that cover all foreign words. Among these the hypothesis with the lowest cost is selected as best translation.

Two hypotheses can be merged, if they agree in (a) the foreign words covered so far, (b) the last two English words generated, and (c) the end of the last foreign phrase covered.

If there are two paths that lead to two hypotheses that agree in these properties, the system keeps the cheaper hypothesis, e.g., the one with less cost so far. The other hypothesis cannot be part of the path to the best translation, and the system can safely discard it. Note that the inferior hypothesis can be part of the path to the second best translation.

FIG. 5 is a flowchart describing a phrase-based decoding operation 500 according to an embodiment. An algorithm describing the operation is shown in FIG. 6. The system may start with an initial empty hypothesis. A new hypothesis is then expanded from an existing hypothesis by the translation of a phrase. A sequence of untranslated foreign words and a possible English phrase translation for them is selected (block 505). The English phrase is attached to the existing English output sequence (block 510). Then the foreign words are marked as translated and the probability cost of the hypothesis is updated (block 515). The cheapest (highest probability) final hypothesis with no untranslated foreign words is the output of the search (block 520).

The hypotheses are stored in stacks. The stack $s_m$ contains all hypotheses in which m foreign words have been translated. The system may recombine search hypotheses. While this reduces the number of hypotheses stored in each stack somewhat, stack size is exponential with respect to input sentence length. This makes an exhaustive search impractical.

Thus, the system prunes out weak hypotheses based on the cost they incurred so far and a future cost estimate. For each stack, the system only keeps a beam of the best n hypotheses. Since the future cost estimate is not perfect, this leads to search errors. Our future cost estimate takes into account the estimated phrase translation cost, but not the expected distortion cost.

For each possible phrase translation anywhere in the sentence (referred to as a "translation option"), the system multiplies its phrase translation probability with the language model probability for the generated English phrase. As language model probability, the system may use the unigram probability for the first word, the bigram probability for the second, and the trigram probability for all following words.

Given the costs for the translation options, the system can compute the estimated future cost for any sequence of consecutive foreign words by dynamic programming. Note that this is only possible, since the system ignore distortion costs. Since there are only n(n+1)/2 such sequences for a foreign input sentence of length n, the system can pre-compute these cost estimates beforehand and store them in a table.

During translation, future costs for uncovered foreign words can be quickly computed by consulting this table. If a hypothesis has broken sequences of untranslated foreign words, the system look up the cost for each sequence and take the product of their costs.

The space of hypotheses generated during the beam search forms a lattice of paths, each representing a translation, for which a translation score can be easily computed. Extracting the n-best paths from such a lattice is a well-studied problem.

Paths branch out, when there are multiple translation options for a hypothesis from which multiple new hypotheses can be derived. Paths join, when hypotheses are merged. As described above, the system may discard a hypothesis if it agrees with a lower-cost hypothesis with some of the same properties. In order to keep the information about merging paths, the system keeps a record of such mergings that contains identifier of the previous hypothesis, identifier of the lower-cost hypothesis, and cost from the previous to higher-cost hypothesis.

Figure 7:
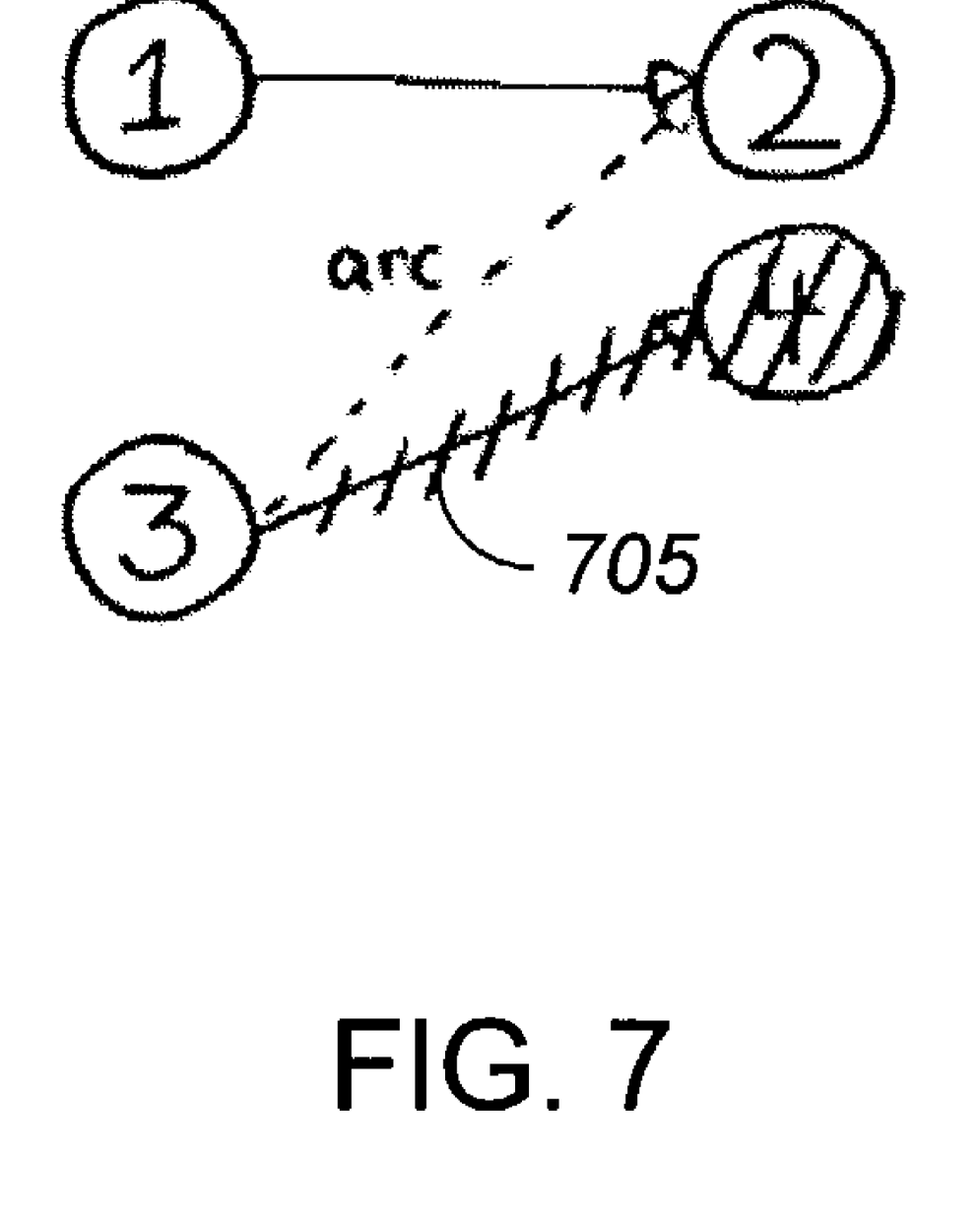
FIG. 7 is a diagram showing generation of an arc between hypotheses.

FIG. 7 gives an example for the generation of such an arc. In this case, the hypotheses 2 and 4 are equivalent in respect to the heuristic search, as detailed above. Hence, hypothesis 4 is deleted. But to retain the information about the path leading from hypothesis 3 to 2, the system stores a record of this arc 705. The arc also contains the cost added from hypothesis 3 to 4. Note that the cost from hypothesis 1 to hypothesis 2 does not have to be stored, since it can be recomputed from the hypothesis data structures.

The beam size, e.g., the maximum number of hypotheses in each stack, may be fixed to a certain number. The number of translation options is linear with the sentence length. Hence, the time complexity of the beam search is quadratic with sentence length, and linear with the beam size.

Since the beam size limits the search space and therefore search quality, the system has to find the proper trade-off between speed (low beam size) and performance (high beam size). In experiments, a beam size of only 100 proved to be sufficient. With larger beams sizes, only a few sentences were translated differently. The decoder translated 1755 sentence of length 5 to 15 words in about 10 minutes on a 2 GHz Linux® system. The system achieved fast decoding, while ensuring high quality.

Figure 4:
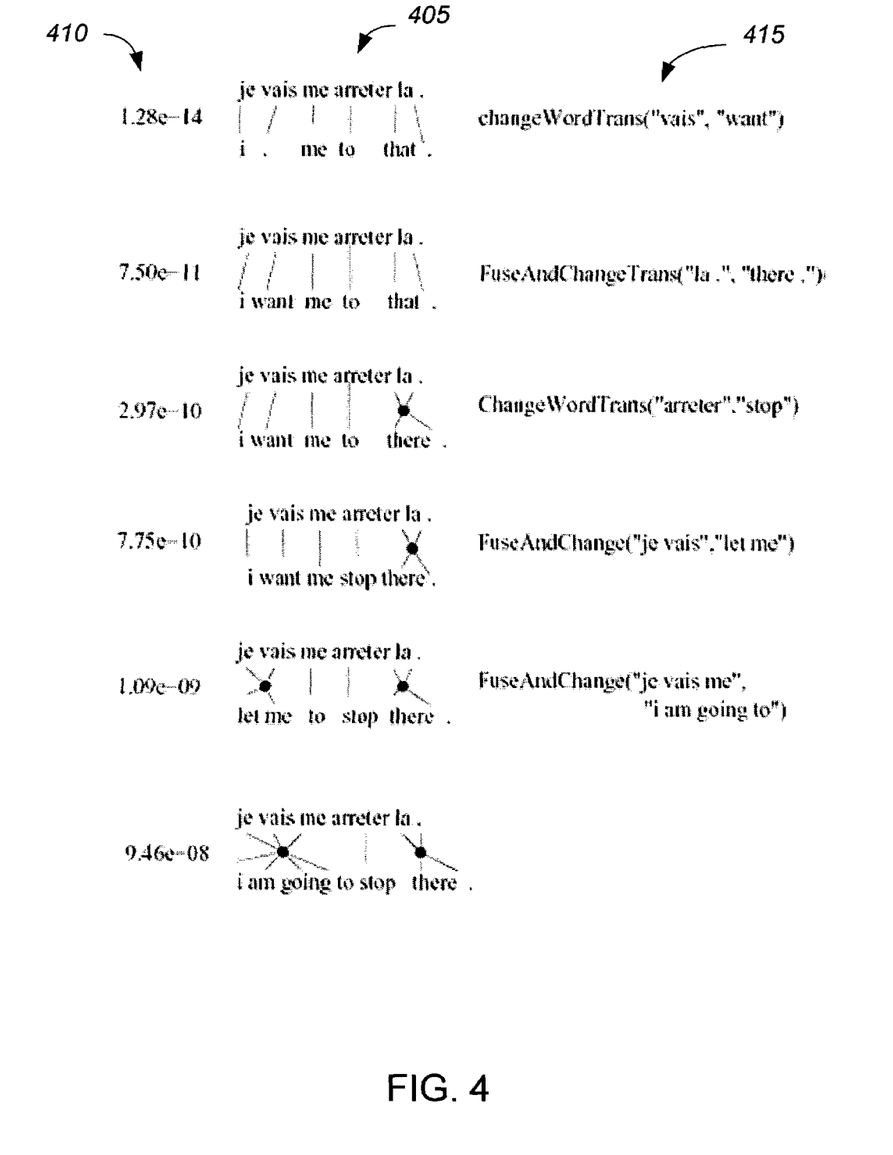
FIG. 4 is shows an example of phrase-based greedy decoding.

In some embodiments, a decoder such as decoder 110 of FIG. 1 may implement a greedy procedure. Given a foreign sentence F, the decoder first produces gloss of it by selecting phrases in E* that the probability p(E, F). The decoder then iteratively hillclimb by modifying E and the alignment between E and F so as to maximize the formula p(E)p(F|E). The decoder hillclimbs by modifying an existing alignment/translation through a set of operations that modify locally the alignment/translation built until a given time. These operations replace the English side of an alignment with phrases of different probabilities, merge and break existing concepts, and swap words across concepts. The probability p(E) is computed using a simple trigram language model. The language model is estimated at the word (not phrase) level. FIG. 3 shows the steps taken by the decoder in order to find the translation of sentence "je vais me arrêter là." Each intermediate translation 405 in FIG. 4 is preceded by its probability 410 and succeeded by the operation that changes it to yield a translation of higher probability.

A number of embodiments have been described. Nevertheless, it will be understood that various modifications may be made without departing from the spirit and scope of the invention. For example, blocks in the flowcharts may be skipped or performed out of order and still produce desirable results. Different translation methods may be used. Accordingly, other embodiments are within the scope of the following claims.

The invention claimed is:

1. A method comprising:
   receiving a phrase $\vec{e}_i$ in a first language; and
   generating a joint probability model from a parallel corpus, the generating based on at least one generated pair of phrases $(\vec{e}_i, \vec{f}_i)$ wherein $\vec{e}_i$ comprises a first number of words and $\vec{f}_i$ comprises a second number of words, the first number being different from the second number.

2. The method of claim 1, further comprising:
   generating a phrase-to-phrase probabilistic dictionary from the joint probability model and the parallel corpus.

3. The method of claim 1, wherein said generating the joint probability model comprises:
   stochastically generating a bag of concepts C;
   for each $c_i \in C$, generating the pair of phrases $(\vec{e}_i, \vec{f}_i)$ according to the distribution $t(\vec{e}_i, \vec{f}_i)$; and
   ordering the phrases generated in each language so as to create two linear sequences of phrases.

4. The method of claims 3, further comprising training the model, the training comprising:
   determining high-frequency n-grams in E and F;
   initializing a t-distribution table with alignments;
   performing Viterbi based EM training for a plurality of iterations; and
   deriving a joint probability model and a conditional probability model.

5. The method of claim 1, wherein generating the joint probability model comprises:
   (1) stochastically generating a bag of concepts C;
   (2) initializing E and F to empty sentences $\epsilon$;
   (3) randomly removing a concept $c_i \in C$ and generating the pair of phrases $(\vec{e}_i, \vec{f}_i)$ according to the distribution $t(\vec{e}_i, \vec{f}_i)$;
   (4) appending the phrase $\vec{f}_i$ to the end of F;
   (5) inserting phrase $\vec{e}_i$, at position l in E provided that no other phrase occupies any of the positions between l and l+| $\vec{e}_i$ |, where | $\vec{e}_i$ | gives the length of the phrase $\vec{e}_i$; and
   repeating steps (3) to (5) until C is empty.

6. The method of claims 5, further comprising training the model, the training comprising:
   determining high-frequency n-grams in E and F;
   initializing a t-distribution table with alignments;
   performing Viterbi based EM training for a plurality of iterations; and
   deriving a joint probability model and a conditional probability model.

7. The method of claim 1, further comprising:
   determining a translation for an input sentence comprising the phrase $\vec{e}_i$ using a greedy decoding operation.

8. The method of claim 1, further comprising:
   determining a translation for an input sentence comprising the phrase $\vec{e}_i$ using a beam search algorithm.

9. A method comprising:
   generating a phrase-to-phrase probabilistic dictionary from a parallel corpus using word-for-word alignments in the parallel corpus and a phrase-based model generated from the parallel corpus, the generating based on a generated pair of phrases $(\vec{e}_i, \vec{f}_i)$ wherein $\vec{e}_i$ comprises a first number of words and $\vec{f}_i$ comprises a second number of words, the first number being different from the second number.

10. The method of claim 9, further comprising determining a best output sentence in a second language for an input sentence in the first language, the determining comprising:
    segmenting the input sentence into a sequence of phrases;
    translating each of the phrases into a phrase in the second language; and
    reordering the output phrases.

11. The method of claim 10, wherein the reordering comprises using a relative distortion probability distribution.

12. The method of claim 9, wherein the generating comprises:

performing a word-to-word alignment on both sides of the parallel corpus to produce a plurality of word alignments; and collecting a plurality of aligned phrase pairs that are consistent with word alignments in said plurality of word alignments.

13. The method of claim 12, further comprising:

estimating a phrase translation probability distribution of the collected phrase pairs based on relative frequencies.

14. The method of claim 13, further comprising:

parsing both sides of the word-aligned parallel corpus with a syntactic parser to generate syntactic parse trees; and for each of the collected phrase pairs, checking if both phrases associated with the collected phrase pair is associated with a subtree in the syntactic parse trees.

15. The method of claim 13, further comprising:

identifying a collected aligned phrase pair of the collected phrase pairs, the collected phrase pair associated with a plurality of alignments; and calculating a lexical weight for each of the plurality of alignments.

16. The method of claim 9, wherein the generating comprises:

performing bidirectional word-to-word alignment operations on the parallel corpus to generate two sets of word alignments.

17. The method of claim 16 further comprising:

identifying alignment points at intersections between the two sets of word alignments.

18. The method of claim 16, further comprising:

identifying alignment points at a union of the two sets of word alignments.

19. A method comprising:

(1) receiving an input string including a plurality of words in a first language;

from an initial hypothesis in a second language, (2) selecting a sequence from said plurality of words in the input string, (3) selecting a possible phrase translation in the second language for said selected sequence, (4) attaching the possible phrase translation to the current hypothesis to produce an updated hypothesis, (5) marking the words in said selected sequence as translated, (6) storing the hypothesis sequence in a stack, and (7) updating a probability cost of the updated hypothesis;

(8) repeating steps (2) to (7) based on a size of the stack to produce one or more possible translations for the input string; and (9) selecting one of said possible translations in the stack having a highest probability.

20. The method of claim 19, wherein the initial hypothesis is empty.

21. The method of claim 19, wherein the each of the possible translations comprises a hypothesis leaving no corresponding untranslated words in the input string.

22. The method of claim 19, wherein updating the probability cost comprises calculating a current cost for the updated hypothesis and estimating a future cost for the updated hypothesis.

23. The method of claim 19, further comprising:

discarding the updated hypothesis if the updated hypothesis has a higher cost than n-best updated hypotheses in the stack, where n corresponds to a predetermined beam size.

24. The method of claim 1, wherein the first number of words or the second number of words is one.

25. The method of claim 9, wherein the first number of words or the second number of words is one.

* * * * *